(12) United States Patent
Heintz et al.

(10) Patent No.: US 9,136,030 B2
(45) Date of Patent: Sep. 15, 2015

(54) CARBON NANOTUBE FILMS AND METHODS OF FORMING FILMS OF CARBON NANOTUBES BY DISPERSING IN A SUPERACID

(75) Inventors: Amy M. Heintz, Dublin, OH (US); Steven M. Risser, Reynoldsburg, OH (US); Bryon P. Moore, Hilliard, OH (US); Joel D. Elhard, Hilliard, OH (US); Chad M. Cucksey, Worthington, OH (US)

(73) Assignee: Battelle Memorial Institute, Columbus, OH (US)

(*) Notice: Subject to any disclaimer, the term of this patent is extended or adjusted under 35 U.S.C. 154(b) by 164 days.

(21) Appl. No.: 12/739,956

(22) PCT Filed: Oct. 27, 2008

(86) PCT No.: PCT/US2008/081394
§ 371 (c)(1),
(2), (4) Date: Jul. 4, 2011

(87) PCT Pub. No.: WO2009/055831
PCT Pub. Date: Apr. 30, 2009

(65) Prior Publication Data
US 2011/0250451 A1   Oct. 13, 2011

Related U.S. Application Data

(60) Provisional application No. 61/000,578, filed on Oct. 26, 2007.

(51) Int. Cl.
*C01B 31/00* (2006.01)
*D01F 9/00* (2006.01)
(Continued)

(52) U.S. Cl.
CPC .. *H01B 1/04* (2013.01); *C09D 1/00* (2013.01); *C09D 5/24* (2013.01); *C09D 7/1266* (2013.01); *C09D 7/1291* (2013.01); *C08K 3/04* (2013.01); *Y10T 428/298* (2013.01)

(58) Field of Classification Search
USPC ......... 977/742, 745, 750, 752, 734; 264/212; 423/414, 445 B, 445 R, 447.1, 447.2; 428/221, 332, 357, 364, 365, 367, 401; 442/327, 334
See application file for complete search history.

(56) References Cited

U.S. PATENT DOCUMENTS 5,853,877 A   12/1998   Shibuta
7,473,404 B2   1/2009   Chopard et al.
(Continued)

FOREIGN PATENT DOCUMENTS

WO   WO2007106836   9/2007
WO   WO2009055831   4/2009

OTHER PUBLICATIONS

Trottier et al., "Properties and characterization of carbon-nanotube-based transparent conductive coating," Journal of Society for Information Display, Sep. 2005, p. 759-763.*
(Continued)

*Primary Examiner* — Matthew Matzek
(74) *Attorney, Agent, or Firm* — Frank Rosenberg; C. Michael Gegenheimer

(57) ABSTRACT

A novel method of forming thin films of carbon nanotubes (CNTs) is described. In this method, carbon nanotubes are dispersed in a superacid solution and laid down on a substrate to form a conductive and transparent CNT network film. The superacid, in its deprotonated state, is an anion that has a permanent dipole moment. The superacid solution may be a pure superacid or have additional solvent. Preferably, the superacid solution does not contain an oxidizing agent. Novel, highly conductive and transparent CNT network films are also described.

17 Claims, 14 Drawing Sheets

(51) Int. Cl.
*H01B 1/04* (2006.01)
*C09D 1/00* (2006.01)
*C09D 5/24* (2006.01)
*C09D 7/12* (2006.01)
*C08K 3/04* (2006.01)

(56) References Cited

U.S. PATENT DOCUMENTS

| | | |
|---|---|---|
| 2003/0143453 A1* | 7/2003 | Ren et al. ............... 429/40 |
| 2003/0170166 A1 | 9/2003 | Smalley et al. |
| 2007/0041887 A1 | 2/2007 | Veedu et al. |
| 2007/0153362 A1* | 7/2007 | Gruner ............... 359/315 |
| 2009/0317660 A1 | 12/2009 | Heintz et al. |
| 2011/0250451 A1 | 10/2011 | Heintz et al. |

OTHER PUBLICATIONS

Hsu et al: "Optical Absorbtion and Thermal Transport of Individual Suspended Carbon Nanotube Bundles,"Department of Materials Science and Department of Electrical Engineering, University of Southern California, Dec. 4, 2008.

PCT Written Opinion of the International Search Authority. PCT/US2008/081394. Mailed Sep. 10, 2009.

Official Action issued in EP Application No. 08 841 218.4 on Apr. 1, 2014.

Cueto, E. et al., "Numerical simulation of spin coating processes involving functionalized Carbon nanotube suspensions," International Journal of Material Forming (2008) 1:89-99. DOI: 10, 1007/S1 2289-008-0377-5.

Fu, L., et al. "Carbon Nanotubes Based Thin Films: Fabrication, Characterization and Applications", Rev. Adv. Mater. Sci. 36 (2014) 40-61.

Qiguan Wang and Hiroshi Moriyama (2011). Carbon Nanotube-Based Thin Films: Synthesis and Properties, Carbon Nanotubes—Synthesis, Characterization, Applications, Dr. Siva Vellampalli (Ed.) ISBN:978-953-307-497-9, Intech, Available from: http://www.intechopen.com/books/carbon-nanotubes-synthesis-characterization-applications/carbon-nanotube-based-thin-films-synthesis-and-properties.

* cited by examiner

CARBON NANOTUBE FILMS AND METHODS OF FORMING FILMS OF CARBON NANOTUBES BY DISPERSING IN A SUPERACID

RELATED APPLICATIONS

This application is a national stage filing and claims the priority benefit of PCT/US08/81394 filed Oct. 27, 2008 and also claims the benefit of priority from provisional U.S. patent application Ser. No. 61/000,578 filed on Oct. 26, 2007.

INTRODUCTION

Carbon nanotube (CNT) networks have the potential to replace transparent conductive metal oxides, such as indium tin oxide, in applications where solution processing and flexibility are important. CNTs can be formulated into dispersions and then applied by solution processing methods to a substrate, yielding flexible nanotube networks with good adhesion to a variety of substrates. The nanotubes networks of this invention are primarily two-dimensional in nature, extending from microns to meters in two dimensions and a thickness that ranges from a few nanometers to a few hundred nanometers in size.

The Figure of Merit (FOM) for a thin transparent conductor is proportional to its bulk conductivity and inversely proportional to its absorption coefficient. CNT networks are composite structures comprised of a mat of CNTs. In this case, the conductivity and absorption coefficient are influenced by the inherent properties of the nanotubes, the network morphology, and the resistance between the nanotubes. For example, the bulk conductivity depends not only on the conductivity of the individual nanotubes, but also on the contribution from the resistances at various types of junctions. The bulk absorption coefficient is determined by the absorption coefficients of the species present (in a typical case, CNTs and air) and the volume fraction of each component. Both the conductivity and the FOM are enhanced by achieving CNT networks with debundled morphologies and long tube lengths.

For a thin film, sheet resistance is often the most relevant measure of conductivity. The sheet resistance is a function of both bulk conductivity and film thickness. The sheet resistance typically decreases with increasing film thickness.

Debundling and dispersing CNTs without destroying the electrical properties of the nanotubes remains a challenge. The dispersion of colloidal particles in general depends on the attractive van der Waals interactions, repulsive or attractive coulombic forces, and repulsive interactions arising from solvation or adsorbed layers. Due to their long length, high anisotropy, and poor compatibility with solvents, the attractive interparticle potential between CNTs is large. CNTs readily form aggregates of aligned tubes with a CNT-CNT binding energy on the order of 500 meV/nm. A number of methods have been developed to disperse CNTs. Typically, these methods have produced dispersed large nanotubes bundles, with the individual tubes in the bundle having significantly altered electronic and/or geometric structure.

Covalent modification of the CNT has been used to achieve dispersion in a range of solvents, depending on the functionality. Under appropriate conditions, high degrees of debundling have also been observed. However, covalent modification is destructive; it disrupts the π-binding and introduces saturated sp3 carbon atoms that significantly decrease the conductivity of the CNT.

Dispersing agents such as surfactants, polymers, and non-covalent dispersing agents have been used to prepare debundled CNT dispersions. These agents must be removed after film formation in order to achieve high conductivity. Rinzler et al. in U.S. Published Patent Application No. 2004/0197546 describe a method that removes the majority of surfactant during a two-step process to produce CNT networks. For some applications, it is desirable to have a formulation that is suitable for a direct deposition process such as spin-coating, dip-coating, draw-down, screen-printing, etc.

Virtually all non-covalent dispersing methods require sonication to achieve dispersion. Sonication is known to cut the CNTs, shortening their lengths. CNT films made with shorter tubes are predicted to have higher resistance for an equivalent weight loading. Shorter nanotubes have a lower aspect ratio, and therefore require a higher loading to achieve a percolating network. Other damage may be done during sonication, as well. Studies suggest that prolonged sonication increase the amount of amorphous carbon or the amount of defective CNTs present. In preferred methods of the present invention (described below), sonication is not used to disperse CNTs.

Many dispersing methods such as those employing aqueous surfactants and amines yield a distribution of dispersed bundles and single tubes. Centrifugation at high gravity is needed to separate the de-bundled CNTs from bundled nanotubes. Centrifugation requires expensive capital equipment and results in low overall yields (<10%). The process generally produces dispersions with only very low concentrations of nanotubes (<100 ppm), and therefore any process using these dispersions would require use of large amounts of solvent. U.S. Published Patent Application No. 2006/0099135 describes the production of high concentration dispersions in aqueous surfactant. However, the sonication process used in this procedure shortens the CNTs to lengths of about 200 nm or less.

Debundled dispersions, such as from aqueous surfactant solution, have been deposited at a small scale by spin coating or solvent evaporation onto silicon wafers and other substrates for analysis. Often, areas of individual tubes can be found by analysis methods such as AFM or SEM. However, during large scale film formation of conductive, percolating networks greater than 5 nm thick, it is observed that the CNT networks are composed of bundled CNTs, often greater than 20 nm thick. This occurs due to re-bundling of the CNTs during film formation. There is a need to a dispersion process and film formation method that maintains the debundled state in the network film.

Strong acids have been shown to readily debundle and disperse SWNTs. Most studies with CNTs and acid have conducted under conditions that oxyfunctionalize, carboxylate, sulfonate, or nitrate the CNTs. Shibuta in U.S. Pat. No. 5,853,877 describes a method of producing a debundled CNT network by the treatment of CNTs with strong acids that include sulfur, i.e., sulfuric acid and sulfur-containing superacids, in conjunction with an oxidizing agent, such as nitric acid, nitrate, permanganate, chromic acid, chromate, hydrogen peroxide and lead dioxide.

Smalley et al. have described neat superacid systems for producing macroscopic fibers (U.S. Published Patent Application No. 2003/0170166) and alewive structures (U.S. Published Patent Application No. 2003/0133865). Carbon alewives (named after a similar-looking fish) have a needle-like shape and are substantially free of tangles and long ropes. In the latter publication, water was used to precipitate aggregates of CNT alewives. In US 20030170166, Smalley et. al. reported that the use of an oleum superacid, without using water to coagulate the CNTs, resulted in the formation of ropes of 200 to 400 nm in thickness. These thick ropes are undesirable for making transparent and highly conductive films.

SUMMARY OF THE INVENTION

The present invention overcomes problems and disadvantages associated with current formulations and processes for producing thin conductive and/or transparent CNT networks. The chemical and electronic structure of the CNTs is not disrupted by the chemical treatment or process. The method does not require sonication to achieve dispersion. Centrifugation is not necessary to achieve de-bundling, but may be used optionally to purify residual impurities in the sample. Formulations can be prepared at high concentration and in a 100% volatile system, thereby allowing application of CNT network films by standard processing methods such as spin-coating and screen printing. Highly debundled CNT networks can then be deposited on polymeric, glass, ceramic, silicon, composite, or other substrates.

Our invention relates to the use of reversible charge transfer reactions that allow debundling and dispersion in solution, maintenance of debundled state during CNT network formation, formation of network structures conducive to high film conductivity, and retention of the original CNT structural and electrical properties after drying. In this method, a reversible charge transfer complex is formed that solubilizes the CNTs in non-nucleophilic solvents.

It has been previously shown that oxidizing conditions (such as nitric acid) can covalently modify CNTs. We have surprisingly discovered that excellent dispersion for CNT network films can be obtained under conditions where side reactions leading to permanent covalent modification of the nanotube are avoided.

In order to overcome the large van der Waals interactions that destabilize dispersions and cause re-bundling during film formation, a repulsive force is introduced by forming a complex between a charged CNT and non-covalently bonded charged species. This complex is electrically neutral, and no net coulombic force exists between charged particles separated by large distances. At shorter distances, the diffuse portions of the double layers interpenetrate, giving rise to a repulsive interaction. The distance over which this overlap occurs depends on the thickness of the double layer and the surface potential.

The CNT can be converted to a positively charged species though reaction with a strong acid. Suitable acids include Bronsted superacids such as chlorosulfonic acid and trifluoromethanesulfonic acid, Lewis superacids such as antimony pentafluoride, conjugate Bronsted-Lewis superacids such as tetra(hydrogen sulfato)boric acid sulfuric acid, and carborane acids. Strong oxidizing acid combinations such as nitric acid/sulfuric acid should be avoided.

A key challenge to preparing thin CNT films from superacid dispersions is controlling the demixing of CNTs from the solution during film formation, which controls CNT-CNT aggregation and facilitates formation of debundled, yet strongly aggregated network. The demixing process is initiated by the use of an organic solvent, which destabilizes the CNT-superacid charge transfer complex. The interaction parameter between the solvent and CNT should be poor; otherwise, the solvent becomes incorporated into the CNT network phase, usually between junctions or within bundles, and lowers the quality and properties of the film.

It has been previously shown that washing a film cast from strong acids with water results in an alewive structure. We show that washing with the proper organic solvent results in a continuous film composed of small bundles of CNTs and with strong interbundle interaction. The invention includes methods of preparing CNT films that includes an intermediate step of coagulating with a suitable organic solvent.

Considering the thermodynamics of a ternary CNT, superacid, and organic solvent system, as well as the kinetics of its phase separation, a phase can be created that contains primarily CNTs, but some residual superacid within bundles. Because the acid forms a strong interaction with the CNT via a charge transfer complex, rapid coagulation with a poorly interacting organic solvent will remove excess acid, but will not remove those acid molecules directly associated with the nanotubes. This process results in a film where the nanotubes are effectively doped during the film formation step, eliminating the need for a separate doping process to achieve high film conductivity, as is required for films formed by other methods.

In a first aspect, the invention provides a CNT network film, comprising: a tangled mass of CNT bundles in the form of a film disposed on a substrate. The CNT bundles have a mass average diameter of 20 nm or less, and have a mass average length of 500 nm or more, and have good fiber-to-fiber connectivity such that the film exhibits a sheet resistance of 5000 ohms/square or less. Note that sheet resistance is the best measure of fiber-to-fiber connectivity, and is necessary to define "good" connectivity.

In another aspect, the invention provides a method of forming a CNT network film, comprising: dispersing CNT bundles in a superacid to form a liquid composition of dispersed CNTs; depositing liquid composition of the dispersed CNTs onto a substrate; and removing the superacid. The superacid either has a deprotonated anion, and the deprotonated anion has a permanent dipole moment greater than zero; or if the superacid is a lewis acid that does not have a proton, then lewis superacid has a permanent dipole moment greater than zero. The superacid solution comprising the dispersed CNTs contains less than 0.001 weight % oxidizing agent, based on the weight of the CNTs in the dispersion. The statement that "the superacid has a deprotonated anion" does not necessarily mean that the deprotonated anion is present in solution, but is used to define the symmetry of the superacid. Typically, however, in solution the deprotonated anion dominates over the protonated form, for example in a pure Bronsted superacid or a conjugate superacid. In some preferred embodiments, the deprotonated anion has a permanent dipole moment of at least 1.0 debye.

An "oxidizing agent" degrades the structure of the CNTs and has acidity in sulfuric acid or a superacid containing sulfur. Examples of oxidizing agents include nitric acid, fuming nitric acid, nitrate (e.g. potassium nitrate, sodium nitrate, etc.), ozone, permanganate (e.g. potassium permanganate, sodium permanganate etc.), chromic acid, chromate, hydrogen peroxide and lead dioxide.

The invention also includes CNT network films formed by any of the methods described herein.

One process for preparing films in this invention involves: selecting a CNT, forming a charge transfer complex with superacid, dispersing in a dispersing medium, forming an initial CNT network film on a substrate (the substrate can be nonporous or could be a filter), and coagulating the debundled CNT structure using a nonaqueous non-solvent. Alternatively, the last two steps can be carried out simultaneously.

Any of the inventive aspects can be further described by any of the characteristics mentioned in any of the descriptions herein. For example, in preferred methods, the liquid composition does not contain sulfuric acid. The methods can further include a step of transferring the film to a second substrate. In some preferred embodiments, the superacid solution comprising the dispersed CNTs contains less than 0.001 weight % or less than 0.0001 weight % oxidizing agent based on the weight of the CNTs in the dispersion. Preferably, the G/D ratio before and after treatment is less than 30%. The methods may further include a step of washing the CNTs with a non-solvent such as diethyl ether or nitromethane.

Another preferred feature and a significant advantage of the methods of the present invention is that a highly conductive and transparent film can be obtained without the need for additional doping steps. After the film is formed, the CNTs do not need to be treated with a doping agent. This surprising result is shown in FIG. 10.

The network morphology produced by this method has a unique composition, wherein the network is composed of: (1) bundles with an average size of 20 nm or less, preferably 10 nm or less, more preferably 5 nm or less, in some embodiments 3 nm or less, and in some embodiments in the range of 2 nm to 10 nm; (2) a high degree of isotropy in the plane of the film (that is, the CNT fibers generally lie in a plane); (3) these relatively thin bundles are primarily composed of CNTs longer than 500 nm, preferably at least 1000 nm in length; (4) strong interbundle interactions as measured by low resistance; and, optionally, (5) charge transfer doping within bundles. The result is network films with exceedingly high bulk conductivity, greater than 5,000 S/cm, preferably greater than 10,000 S/cm, and more preferably greater than 13,000 S/cm. Films preferably have high transparency and low sheet resistance, for example, 98% T at 550 nm and 1100 Ω/square. Throughout this description, "average" means mass average based on total mass of CNTs and excludes non-CNT material such as the carbonaceous clumps that can be seen in FIG. 3.

In a further aspect, the invention provides a CNT network film composition, comprising: a substrate, and a CNT network film on the substrate; wherein the CNT network film has a transparency of at least 50%, a sheet resistance of 5000 ohms/square or less, and a G/D ratio based on the average of Raman excitation bands at 532 and 633 wave numbers of at least 15. The CNT network film has a bulk conductivity exceeding 11,000 S/cm. Preferably the CNT network has an area of at least 1 cm×1 cm and the sheet resistance is measured on a square of 1 cm by 1 cm.

In another aspect, the invention provides a CNT network film composition, comprising: a substrate, and a CNT network film and a liquid on the substrate; wherein the liquid comprises a superacid. Either the superacid has a deprotonated anion, and the deprotonated anion has a permanent dipole moment greater than zero; or if the superacid is a lewis acid that does not have a proton, then lewis superacid has a permanent dipole moment greater than zero. This aspect is similar to the corresponding method described above and can have any similar features. For example, in a preferred embodiment, the liquid comprises a superacid and less than 0.001 weight % oxidizing agent, based on the weight of the CNTs in the CNT network film. The superacid should be volatile. Note that this composition is an intermediate that could be subsequently applied to a substrate.

The CNT network films can be further characterized by various film properties. Preferably, the films have a transmittance of at least 80%, more preferably at least 90%. Note that transmittance (also termed transparency) is measured at 550 nm unless specified differently. Sheet resistance is the best measure of fiber-to-fiber connectivity. Sheet resistance, if possible should be measured on a square having dimensions of 1 cm×1 cm. In some embodiments, the film has an area of at least 1 cm×1 cm, in some embodiments an area of at least 2 cm×4 cm, or at least 8 cm×6 cm; and in some embodiments, the film has an area (where area refers to geometric area, not surface area) of at least 1 cm$^2$, more preferably at least 8 cm$^2$, and in some embodiments, in the range of 1 cm$^2$ to 1000 cm$^2$. Preferably, the CNT bundles have good fiber-to-fiber connectivity in the CNT network such that the film exhibits a sheet resistance of 1000 ohms/square or less, more preferably a sheet resistance of 500 ohms/square or less, and in some embodiments, a CNT film exhibits a sheet resistance in the range of 200 to 3000 ohms/square. The films can be characterized by the data described herein, and can also be described based on any combination of properties described herein. For example, the films can also be described by the data shown in FIG. 1; films can be described by the function % T=9×log (Resistivity)+66, where "log" is base 10, and this function can be used to describe either an upper or lower bound of film properties, or an approximate value. The films can also be described by their G/D ratio based on the average of Raman excitation bands at 532 and 633 wave numbers, preferably the G/D ratio is at least 15. The CNT network films can also be described in terms of thickness; preferably the films have a thickness of 45 nm or less, more preferably 30 nm or less, and in some embodiments, 15 nm or less, and in some embodiments, the films are at least 10 nm thick.

GLOSSARY

The term "carbon nanotubes" or "CNTs" includes single, double and multiwall carbon nanotubes. The invention is not limited to specific types of CNTs. Suitable carbon nanotubes include single-wall carbon nanotubes prepared by HiPco, Arc Discharge, CVD, and laser ablation processes; double-wall carbon nanotubes (DWNTs), single double triple wall carbon nanotubes, and multi-wall carbon nanotubes, as well as covalently modified versions of these materials. The CNTs can be any combination of these materials, for example, a CNT composition may include a mixture of single and multiwalled CNTs, or it may consist essentially of DWNT and/or MWNT, or it may consist essentially of SWNT, etc.

Debundled CNTs are preferably composed primarily (the majority of bundles, based on total mass of CNT bundles, are of this size) of bundles that are five nanotubes wide or narrower, more preferably fewer than 3 nanotubes wide or narrower.

A CNT network film is a phase comprising CNTs (primarily randomly oriented in two dimensions) and superacid. The superacid is preferably present at contents of less than 5% by weight (based on weight of CNTs plus superacid), and exists primarily at interbundle junctions and between bundles, within interstitial spaces. A CNT network film can exist by itself, can be disposed on a substrate; it can also be encapsulated in a material such as a polymer, or sandwiched between layers of differing materials.

As is typical of patent terminology, "comprising" means including and permits other components. In any of the descriptions, the invention includes articles and methods where "comprising" can be replaced by the more limiting terms "consisting essentially of" and "consisting of."

DETAILED DESCRIPTION OF THE INVENTION

Figure 1:
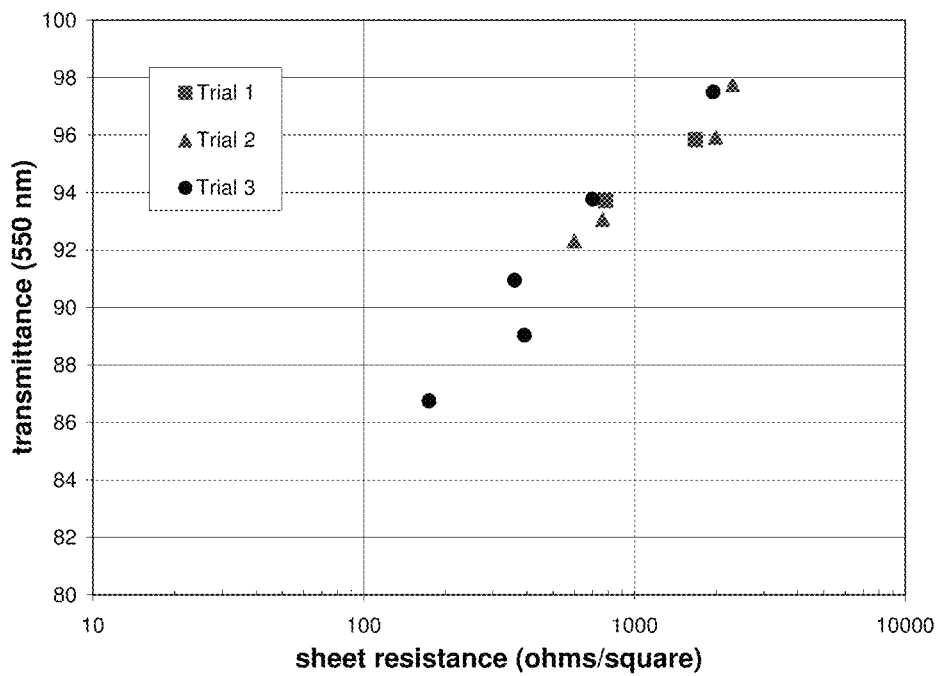
FIG. 1 is a plot of transmittance versus sheet resistance for HiPco SWNT network samples prepared according to this invention.

The morphology and structure of a CNT network are described by several parameters. CNTs can be described by length and diameter. Prior art dispersion methods that use sonication, oxidation, and/or covalent modification tend to damage the CNT structure. The dispersion process employed in this invention, superacids, does not change the CNT structure. Analysis of a network film described by this invention will show that the sidewall perfection and the length of the CNTs is high. The length of the individual CNTs within the network can be determined by TEM analysis. The mass fractions of CNTs in a sample can be measured by SEM, TEM, or other appropriate analytical technique.

CNTs can also be described by bundle size. Rebundling is prevented in this invention due to the CNT-acid charge transfer complex, which established a large diffuse electric double layer. As the liquid, such as superacid or superacid/solvent mixture, is removed during the initial CNT network formation, the diffuse portions of the double layers interpenetrate, giving rise to a repulsive interaction between CNTs. The distance over which this overlap occurs depends on the thickness of the double layer and the surface potential. A high dielectric constant maintains the debundled network structure. Analysis by SEM, TEM, AFM, or Raman spectroscopy provides characterization of the bundle size.

A third level of structure is described by the bundle characteristics. In general, CNTs are composed of a mixture of semiconducting and metallic tubes. Bundles will contain a mixture of both according to the statistics of the system. It is possible to make bundles have a more metallic-like character through these use of dopant; generally more metallic-like behavior is desirable for electrical conductivity. Dopants, such as p-dopants, are often added in a second step. In this invention, the dopants are the acids and part of the dispersing process. Evidence of p-doping can be determined spectroscopically, for example, by examining the optical absorbance spectrum. Depletion of filled states by an electron acceptor results in bleaching of the van Hove transitions, and evidence of p-doping by the subject coating. Evidence for p-doping is observed by measuring the spectrum, and then comparing the spectrum after treatment with an n-dopant like hydrazine, which will show evidence of any bleached transitions.

The final level of structure is described by the organization and interactions between bundles. The interactions between bundles provide the cohesion within the film. By analogy with polymer films, the interbundle interactions are the "crosslinks" between bundles. Preferred structures for good film formation and high electrical conductivity have strong interbundle interactions at the junctions between bundles. In this invention, the interbundle interactions can be enhanced by using a non-solvent to coagulate the structure. The interbundle interactions are controlled by controlling the thermodynamics and the kinetics of the phase separation process that occurs upon addition of a non-solvent to the dispersion or to the initial CNT network. The non-solvent should be miscible with the acid, but a non-solvent for the CNTs. The non-solvent is chosen such that the interaction parameter between non-solvent/CNT is much weaker than between either CNT/acid or acid/non-solvent. This promotes rapid aggregation in the debundled network state.

In the prior art, CNT superacids dispersions have been used with water or dilute sulfuric acid as coagulating agents. We found that the use of water as a non-solvent was ineffective in producing cohesive, debundled CNT films. This is due to the strong interaction between water and CNTs. Water and other molecules that strongly interact with CNTs, adsorb to the surface of the CNTs and decrease the interaction strength between CNTs. To our surprise, the addition of poorly interacting solvents such as diethyl ether to initial CNT networks yielded cohesive, debundled CNT films. The strong, interbundle interactions in the films produced in this invention are exemplified by the shrinkage in the network structure that occurs upon addition to the appropriate solvent. The shrinkage results in higher density networks with outstanding electrical and mechanical properties, as described in the Examples.

The inventive methods preferably avoid the use of water and, preferably, use a nonsolvent to coagulate the CNTs (this step can occur prior to, simultaneously with, or after dispersing the CNTs on a substrate. Non-solvents which are not suited include non-solvents with high capacity for hydrogen bonding, such as water and alcohols. These can be determined from the hydrogen-bond component of their Hansen solubility parameter. Simple ethers (diethyl ether, dipropyl ether, dibutyl ether) can be suitable, but ethers with multiple oxygens such as diglyme have too much hydrogen bonding. One criterion for determining the suitability, or lack thereof, for a potential non-solvent is to examine its value of the hydrogen-bonding component of the Hansen solubility parameter. We have found that $\delta_h$ should have a value below 15 $(MPa)^{1/2}$ for the for the material to be a potential non-solvent for this invention.

The reactivity of CNTs towards acids depends on the diameter of the nanotube. The purity and the initial morphology also play a role in reactivity. In its broader aspects, the invention applies generally to all CNTs. The CNTs that may be dispersed by this method include straight, bent, or branched single wall carbon nanotubes (SWNTs), straight, bent, or branched multi wall carbon nanotubes (MWNTs), straight, branched, or bent few wall nanotubes (FWNTs), and their mixtures. CNTs with average diameter from 0.5 nm to 60 nm may be used. Given the differences in reactivity as a function of sidewall curvature, selection of an appropriate acid depends on the CNT feedstock. CNTs may also include ultra-long CNTs (>1 cm) and ultra-pure CNTs. The class of peapods, substitutionally doped CNTs, and filled CNTs may be used.

A Bronsted superacid is defined as an acid stronger than 100% sulfuric acid. A Lewis superacid is defined as an acid stronger than anhydrous aluminum trichloride. Suitable acids include Bronsted superacids such as halosulfuric acids (for example, chlorosulfonic acid and fluorsulfuric acid) and perfluoroalkanesulfonic acids (e.g., trifluoromethanesulfonic acid), Lewis superacids such as antimony pentafluoride, arsenic pentafluoride, tantalum pentafluoride, niobium pentafluoride, conjugate Bronsted-Lewis superacids such as tetra(hydrogen sulfato)boric acid sulfuric acid, and carborane acids such as $CHB_{11}R_5Cl_6$, $CH B_{11}R_5Br_6$, and $CH B_{11}R_5I_6$, where R is H or CH3. Preferred acids include chlorosulfonic acid and trifluoromethanesulfonic acid. The invention also includes mixtures of any of these superacids in any permutation. Strong oxidizing acid combinations that degrade CNTs such as nitric acid/sulfuric acid should be avoided. Oleum is also not a suitable acid combination for this invention.

Without being held to a specific theory, we theorize that there are two important factors that determine the suitability of an acid or acid combination for this invention. One is that the acid must not strongly oxidize the nanotubes, to prevent the introduction of defects, which lowers the intrinsic conductivity of the individual nanotubes. Secondly, the acid should have a permanent dipole moment. For protic acids, determination of the dipole moment should be when in the deprotonated state. When the acid solvates the individual nanotubes, the permanent dipole moment indicates that the acid will have a preferred orientation relative to the nanotube. In deprotonated chlorosulfonic acid, the dipole lies along the S—Cl bond. If the preferred orientation of CSA is, for example, with this dipole normal to the nanotubes surface, with the Cl atom away from the nanotube, when two solvated nanotubes come close together, there will be a strong dipole repulsion helping keep the nanotubes separated. This interaction will be absent with an acid such as sulfuric acid or in an acid mixture such as oleum.

Again, not being bound by any specific theory, we believe that the desired exhibited by compounds suitable for the present invention can in part be expressed in terms of relative dispersion, polar, and hydrogen bonding components of Hansen type solubility parameters, and relative octanol-water portion coefficients (Log P). For example, suitable compounds such as chlorosulfonic acid and triflic acid have overall Hansen solubility parameters of 30-40, with polar fractional components of 20-30, compared to unsuitable compounds such as sulfuric acid, which has a much higher solubility parameter ~70, with a higher value of the polar component: ~60. These solubility parameter manifest themselves in such properties as surface tension, where chlorosulfonic acid and triflic acid may be in the range of ~100-200 dyne-cm, while sulfuric acid is only ~30 dyne-cm, and Log P where CSA and TFA have estimated values in the range of positive (+) 0.1-0.6, more soluble in the organic phase, while sulfuric acid is ×10 more soluble in the aqueous phase Log P=negative (−1). In preferred embodiments of the present invention, the superacid preferably has a Hansen solubility parameter of 40 or less, in some embodiments in the range of 30-40.

The CNT charge transfer complex must be dissolved in a dispersion medium, such as a solvent. Suitable solvents for the CNT/acid charge transfer complex include the neat superacid itself or mixtures of superacid. In some preferred embodiments, the superacid is chosen from the family of volatile superacids such as chlorosulfonic acid trifluoromethanesulfonic acid, or antimony pentafluoride. Preferred volatile superacids have a vapor pressure of at least 0.1 atm at 100° C., more preferably at least 0.5 atm at 80° C.

Alternatively the CNT/acid charge transfer complex may be dissolved in solvents including low-nucleophilicity solvents such as liquid $SO_2$, $SO_2ClF$, and $SO_2F_2$; typical Friedel-Crafts solvents such as diethyl ether, nitromethane, and tetrahydrofuran; or deactivated aromatic solvents such as nitrobenzene. The superacid/solvent combination must have sufficiently high dielectric constant to maintain the large diffuse electric double layer. In preferred embodiments, the solvent has low nucleophilicity and high dielectric constant. Preferably, the dielectric constant is greater than 35, more preferably greater than 60.

Dispersions are prepared by mixing the CNTs with a superacid, and optionally diluting with solvent, under an inert environment at preferably at temperatures ranging from −78° C. to 120° C., depending on the reactivity of the CNT. At higher temperatures the screening length is expected to increase due to an increase in the ionic strength, which will decrease the effective distance of the repulsive interaction. The temperature stability of the superacid must also be considered. The temperature and time of the mixing process should be controlled to insure that sidewall damage to the CNTs is not incurred. The extent of sidewall damage can be monitored by precipitating the dispersion into a non-solvent and analyzing the CNTs by Raman spectroscopy, NIR spectroscopy, or TGA, as described in Measurement Issues in Single Wall Carbon Nanotubes. NIST Special Publication 960-19.

Additives may be incorporated for improved gloss, durability, or other physical and mechanical properties. Preferably, these additives are avoided to maintain the highest conductivity.

Initial CNT networks can be formed from the dispersion using known methods to produce CNT networks on substrates. For example, the dispersion can be passed through a porous membrane filter to form a CNT mat. The membrane filter must be compatible with the solvent combination. Suitable membrane filters include those made of alumina, glass, PVDF, PTFE, PEEK, and polypropylene.

If volatile superacids are used, films can be formed by direct deposition methods such as spin coating, dip coating, and screen printing. Substrates must be selected that are compatible with acid. Suitable substrates include glass, PTFE, PVDF, polypropylene, Kevlar, PEEK, ceramic, and others that would be recognized as being compatible with the acid.

The formation of cohesive CNT networks can be carried out by adding a non-solvent to the CNT film. Preferred non-solvents are miscible with the superacid and have poor interaction with the CNT. Volatile solvents with boiling point less than 80° C. (at 1 atm) are preferred. Non-solvents can include ethers such as diethyl ether or THF, nitrogen-containing compounds such as nitromethane, or ketones such as acetone and methyl ethyl ketone. The non-solvents preferably do not contain water (they are non-aqueous).

The cohesive, CNT network films, once formed, are strong and can be transferred in a second step, if desired to other substrates such as glass, polyester, silicone, polyethylene, etc using methods known in the art. Examples include, but are not limited to floating, direct pressure transfer, and pad printing.

In some embodiments, the CNT network has good cohesion, average bundle sizes less than 10 nm, and is p-doped. In some preferred embodiments, the sample contains 0.01 wt % or less of S.

In preferred embodiments, water and other competing bases or reducing agents should be avoided during dispersion and film formation, in order to prevent nanotube aggregation. Adventitious moisture in the air does not dramatically cause bundle formation on the time scale of the film formation process, but film formation under nitrogen, argon, or other inert gases is preferable. Decomposition of the CNT cation to permanently oxidized species can be avoided by maintaining temperatures below 120° C. during dispersion of the CNTs and, also, preferably, during the film-forming process. Preferably, no sonication is used in the inventive methods.

The following examples describe this invention in greater detail, and demonstrate its advantages over the prior art. One important feature of the disclosed method is that the network morphology created is unique in that it is composed of long CNTs (greater than 500 nm), organized into very small bundles (preferably 20 nm or less, more preferably 10 nm or less, and still more preferably 5 nm or less), and with strong interbundle cohesion. The inventive process promotes film formation of CNT networks. This is demonstrated by comparing examples using different non-solvents. The unique morphology yields films with outstanding electrical conductivity and low sheet resistance for films thinner than 5 nm. This is demonstrated by measuring the sheet resistance and optical transmission of thin films deposited on polyester substrates. The use of superacid disperses and debundles the CNTs without damaging them, cutting them, or fractionating them. This is demonstrated by comparing the Raman spectra and thermal gravimetric analysis data of SWNTs before treatment and after treatment. To better differentiate the advantages inherent in this invention, an example of a control sample prepared by a standard film formation method of sonication in aqueous surfactant is provided. A second advantage of this invention is that superior electrical properties of the CNT film can be achieved at very low loadings of CNTs.

EXAMPLES

Sample Characterization

The sheet resistance of CNTs films was measured by the Jandel Universal Probe and Corrware software. The Universal Probe consists of four 100-um tip radius pins, spaced 1 mm apart, aligned linearly. The films are placed in contact with the pins under 25 g of spring pressure. Current was increased from −0.1 mA to 0.1 mA at a rate of 0.01 mA/sec. All samples exhibited ohmic response. The sheet resistance was determined by: $Rs=4.532\times(V/I)\times GFC$, where V/I is the resistance, and the correction factor (GFC) is based upon film thickness vs. pin spacing. Given the thickness of these films, the correction factor is typically 0.99. Alternatively, the sheet resistance can be measured by painting two parallel electrodes created with silver paint onto the CNT film along opposite edges of 1"×1" square. A digital multimeter can be used to determine the sheet resistance.

Near infrared (NIR) and visible spectra of nanotube films were acquired using a Varian Cary 5000 UV/Vis/NIR spectrophotometer over the range of 3000 nm (3333 $cm^{-1}$) to 400 nm. The spectra were acquired at a scan rate of 600 nm/minute with a spectral band width of 2 nm with an averaging time of 0.1 seconds. In general, the samples were run against a background of air. A blank substrate, not containing CNTs, as also run against air. The percent transmission was determined at 550 nm by comparing the ratio of the transmission from the sample to the ratio of the transmission from the blank.

The Raman spectra of CNT films were acquired on a Horiba-JY "Aramis" Raman Confocal Microspectrometer operated in the backscattering mode at 633 nm excitation. The sample was brought into optical focus with a 20× microscope objective. The Raman signal was optimized using the Real Time Display feature with further adjustment of the Z-direction distance. To insure that no sample heating effects were observed, the laser power was minimized to 5 mW at the sample. The stability of the position of the G-band can be used to analyze for heating effects. Data acquisition employed a 1-second acquisition time and 4 $cm^{-1}$ resolution; 16 spectra were signal averaged. Spectra were acquired at several places on the samples to obtain an overall average of the intensity of specific Raman bands. The G/D ratio is determined by measuring the integrated intensity for the D mode (1322 cm-1 at 532 nm excitation) and the G mode (1580 cm-1 at 532 nm excitation). We also compared the ratio of the maximum intensity and found the result to be the same. A G/D ratio based on the average of Raman excitation bands at 532 and 633 wave numbers is determined by measuring the integrated intensity for the D mode and the G mode at both 532 nm and 633 nm and averaging these values.

Thermogravimetric analysis was carried out on a Perkin Elmer Pyris 1 TGA. The temperature is calibrated using the Curie point transition of Perkalloy and Alumel, the balance is calibrated using a 100 mg weight and the furnace is calibrated from 50-900° C. by the analysis software. Approximately 7 mg was loaded into Pt pan. The heating rate was 10° C. per min in air.

Film Formation

Example 1

Formation of Cohesive, Debundled CNT Films—Method A

Purified-grade SWNTs prepared by the HiPco process (SWNT-HiPco) were obtained from Carbon Nanotechnologies, Inc. The SWNTs are reported to have an ash content less than 15 wt %. A dispersion was prepared by adding 10 mg SWNT-HiPco to 50 mL of chlorosulfonic acid and stirring (using a bar magnet over a stir plate) at room temperature for 12 hours. A known volume of the dispersion was passed through a 0.2 μm Anodisc membrane, with vacuum assistance, to create the initial CNT network of desired thickness. In some cases, the dispersion was diluted with more acid to allow preparation of very thin films. Approximately, 50 mL of diethyl ether was added as a non-solvent, while maintaining vacuum. The color of the SWNT network changed from yellow-brown to black upon washing. The film may be observed to release at the interface between the film and the Anodisc, which arises due to shrinkage caused from good non-solvent choice and the formation of cohesive interbundle interactions. The SWNT network film was released from the membrane filter by dipping the coated membrane filter into a water bath. The SWNT network film floated to the surface of the water and was picked up with a substrate such as polyester or glass. Visual inspection of a film shows that the film is homogeneous.

The transmission of CNT coatings prepared by Example 1 and Method A were determined at 550 nm. The optical transmission is directly related to the volume fraction of nanotubes in the coating and the thickness. The transmission versus sheet resistance of these samples is shown in FIG. 1. As expected based on a percolation model, the sheet resistance decreases with increased transmission. Near the percolation threshold, it is expected that the sheet resistance will dramatically increase. The volume fraction at which percolation is achieved depends on the aspect ratio of the nanotubes. Since the transmission versus sheet resistance is fairly linear in the range tested, the loading is evidently well above the percolation threshold, consistent with the presence of long nanotubes that were not shortened by the dispersion process.

It should be noted that the results of further examples will be compared to the data presented here. The results given in FIG. 1 can be roughly represented as lying along a straight line. Films which have superior performance will lie above or to the left of this line, while films with poorer performance will lie below or to the right of this line.

Example 2

Formation of Cohesive, Debundled CNT Films—Method B

A dispersion was prepared, as described in Example 1. A known volume of the dispersion was passed through a PVDF membrane filter, with vacuum assistance, and dried by passing a stream of dry air over the membrane to create the initial film. Diethyl ether was added as a non-solvent, while maintaining vacuum. The dried SWNT network film was placed in contact with a polymeric substrate such as Mylar and transferred to the Mylar by applying pressure. Visual inspection of a film shows that the film is homogeneous.

Example 3

Formation of Cohesive, Debundled CNT Films—Method C

Direct deposition methods such as spin-coating and dip-coating may be used to prepare thin films on compatible substrates such as glass. As an example, thin films were prepared by spin coating. Purified-grade SWNTs prepared by the HiPco process (SWNT-HiPco) were obtained from Carbon Nanotechnologies, Inc. The SWNTs are reported to have an ash content less than 15 wt %. A dispersion was prepared by adding 50 mg SWNT-HiPco to 10 g of chlorosulfonic acid and stirring at room temperature for 120 h. The resulting viscous dispersion was applied to a glass substrate by spin coating at speeds from 2,500 to 5000 rpm for 2 minutes under Ar atmosphere. After drying, the coated glass slides were subsequently washed with diethyl ether. The sheet resistance of these samples was 176 $\Omega$/square and 110 $\Omega$/square, respectively, and the transmission was greater than 60% at 550 nm. Spin-coating uses less solvent than other processing methods and produces optical quality films with low RMS roughness. Visual inspection of a film shows that the film is homogeneous.

Comparative Example 1

Use of Water as the Non-Solvent

Smalley et al. have described neat superacid systems for producing macroscopic fibers (U.S. Published Patent Application No. 2003/0170166) and alewive structures (U.S. Published Patent Application No. 2003/0133865). In the latter publication, water was used to precipitate aggregates of aligned SWNTs. A dispersion was prepared, as described in Example 1. A known volume of the dispersion was passed through a 0.2 µm Anodisc membrane to create the initial CNT network. 50 mL water was added as the non-solvent, while maintaining vacuum. Upon immersion into water to float the sample, the films shredded and tore, rather than releasing, indicating poor interbundle cohesion and poor film forming properties. Water cannot be used as a coagulant to prepare cohesive, debundled CNT films.

Comparative Example 2

Use of Oleum

A dispersion was prepared, as described in Example 1, except substituting oleum for chlorosulfonic acid. A known volume of the dispersion was passed through a 0.2 µm Anodisc membrane, with vacuum assistance, to create the initial CNT network of desired thickness. Approximately, 50 mL of diethyl ether was added as a non-solvent, while maintaining vacuum. The SWNT network film was released from the membrane filter by dipping the coated membrane filter into a water bath. The SWNT network film floated to the surface of the water and was picked up with a substrate such as polyester or glass.

Visual inspection of a film shows that the film contains black specks. The black specks arise due to phase separation of the CNTs that occurred during addition of the non-solvent. Cohesive, debundled networks films cannot be prepared from oleum.

The sheet resistance of films prepared from oleum were higher then films prepared by Example 1. For example, a film prepared by the method Comparative Example 2 had a sheet resistance of 592 $\Omega$/square and a percent transmission of 80.1%; as observed by comparison with FIG. 1, this value is to the right of the line, exhibiting poorer performance.

Example 3

Use of Different Non-Solvents

Films were prepared as in Example 1 with Method A, using different non-solvents, for diethyl ether

| Solvent | Result |
| --- | --- |
| Ether | Excellent film |
| THF | Good film |
| Acetone | Good film |
| Methanol | Poor film |
| Ethanol | Poor film |
| Isopropanol | Poor film |
| Diglyme | Poor film |
| Chloroform | Poor film |
| Nitromethane | Excellent film |
| Nitrobenzene | Poor film |

The suitability of a solvent for this invention is determined by multiple factors, including among others its interaction with the CNT, interaction with acid, rate of evaporation, and hydrophobicity.

Unique Morphology of Films of this Invention

Example 4

SEM and Raman of Super-Purified HiPco SWNT

The morphology of resulting CNT networks can be characterized by a combination of SEM and Raman spectroscopy. Super-purified grade nanotubes (SWNT-HiPco-SP) were chosen to demonstrate the high efficiency of this method for producing debundled CNT networks, even from high purity CNT sources. High purity nanotubes containing low levels of residual amorphous carbon often present the greatest challenge from a standpoint of debundling and dispersion.

Super-purified grade SWNTs prepared by the HiPco process (SWNT-HiPco-SP) were obtained from Carbon Nanotechnologies Inc. The SWNTs are reported to have an ash content less than 5 wt %. A dispersion was prepared by adding 0.3 mg SWNT-HiPco-SP to 140 mL of chlorosulfonic acid and stirring for 3 h at room temperature and 48 h at 80° C. Coatings were deposited on a polyester substrate using Method A of Example 1.

Figure 3:
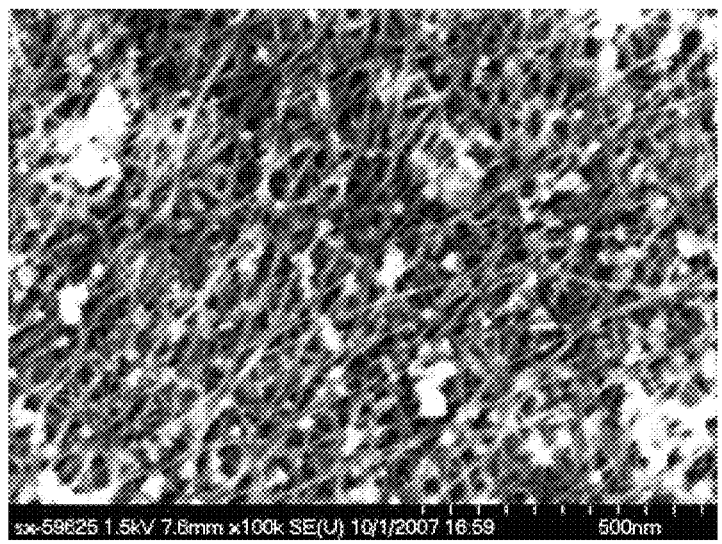
FIG. 3 is an SEM image of a CNT network film of SWNT-HiPco-SP CNT fibers prepared according to this invention.
Figure 2:
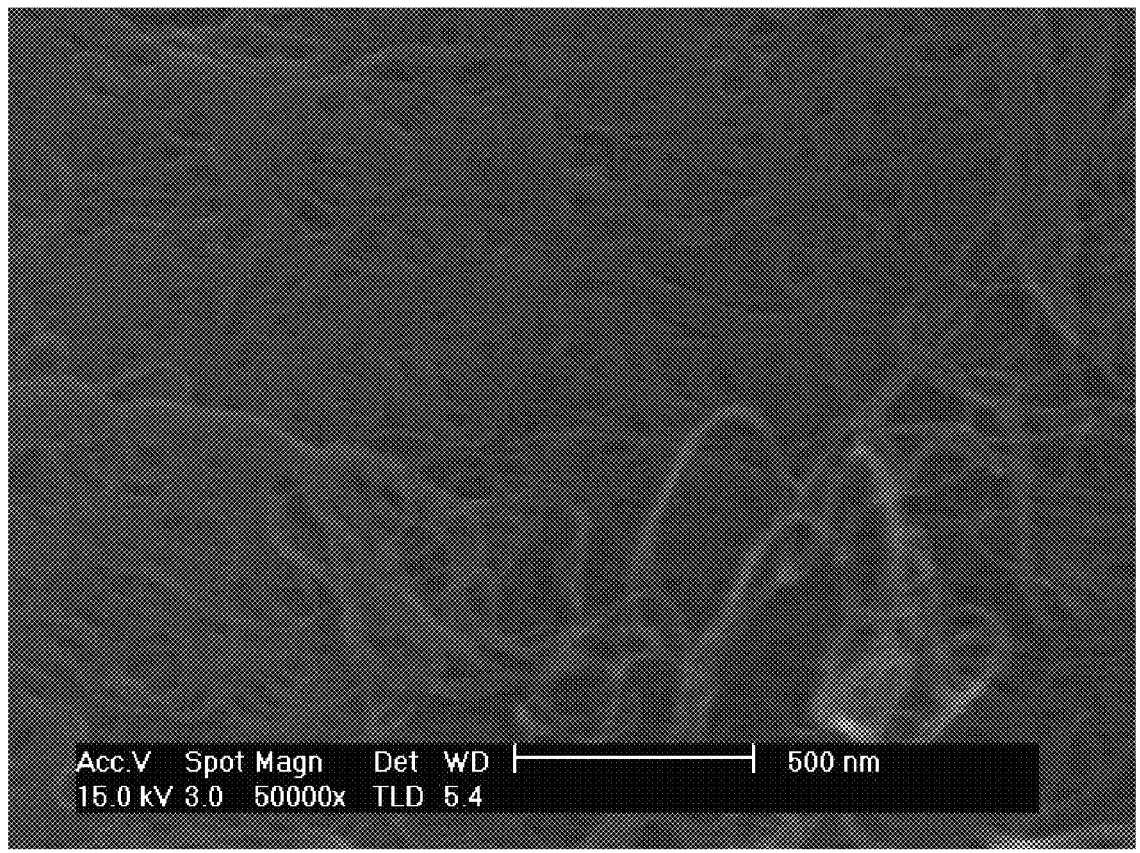
FIG. 2 is an SEM image of as received SWNT-HiPco-SP CNT fibers.

An SEM image of the SWNT-HiPco-SP before dispersion is shown in FIG. 2. An SEM image of a ~100 nm thick CNT network prepared from chlorosulfonic acid dispersion is shown in FIG. 3. The powder is composed of dense aggregates composed of entangled super-ropes. After dispersion and film formation, SEM shows that both the aggregate and super-rope structures have been disrupted. The sample is composed of <10 nm bundles. Large quantities of spherical-like impurities are present in both samples. These can be removed by centrifugation of the dispersion prior to film formation.

Figure 4:
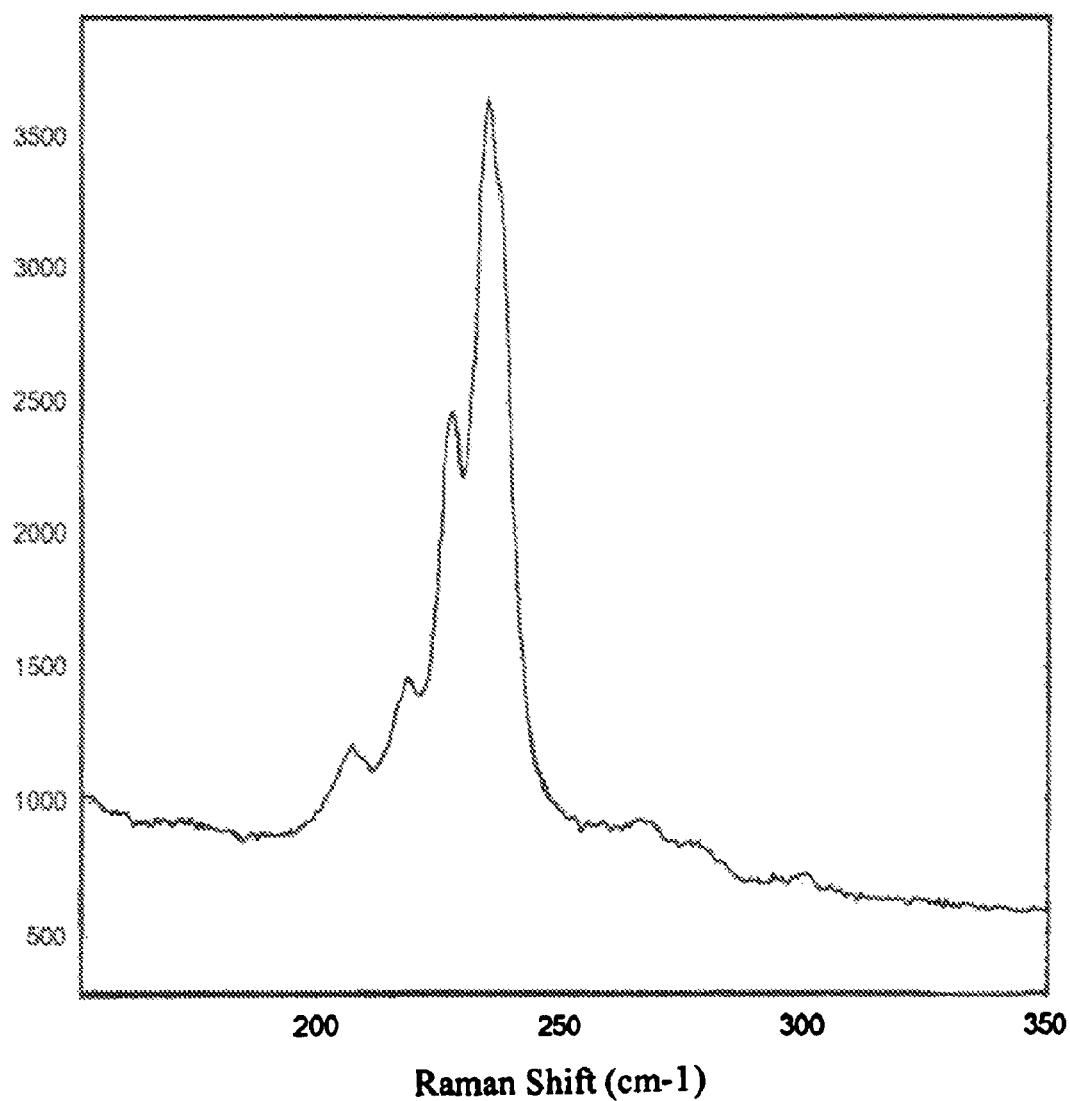
FIG. 4 is a Raman spectrum of SWNT-HiPco-SP obtained at 785 nm excitation.

The radial breathing modes observed in the Raman spectrum are another indicator of the degree of debundling. The electronic dispersion of an individual SWNT can be altered by aggregation. Development of electronic dispersion orthogonal to the usual 1D dispersion can cause bands to go out of resonance or go into resonance. For example, bands at 267 $cm^{-1}$ and 204 $cm^{-1}$ arising from (10.2) and (13.2) type nanotubes come into resonance at 785 nm when the nanotubes are bundled. The Raman spectrum of the coating prepared from highly purified HiPco SWNT is shown in FIG. 4. Virtually no band is observed at 267 $cm^{-1}$, consistent with a highly debundled SWNT sample.

Structure of CNTs in Films Produced by this Invention

Example 5

Treatment of SWNT-HiPco with Chlorosulfonic Acid

Purified-grade SWNTs prepared by the HiPco process (SWNT-HiPco) were obtained from Carbon Nanotechnologies, Inc. The SWNTs are reported to have an ash content less than 15 wt %. A dispersion was prepared by adding 10 mg SWNT-HiPco to 50 mL of chlorosulfonic acid and stirring at room temperature for 12 hours. The treated SWNTs were collected by passing the dispersion through a 0.2 μm Anodisc membrane and then washing two times with 150 mL diethyl ether. The powder was dried for 12 hours at 110° C. and then for 24 hours in vacuum at 160° C. The sample was subsequently characterized by Raman spectroscopy and thermal gravimetric analysis.

Comparative Example 3

Treatment of SWNT-HiPco by Sonication (Control)

Purified-grade SWNTs prepared by the HiPco process were obtained from Carbon Nanotechnologies, Inc. The SWNTs are reported to have an ash content less than 15 wt %. A dispersion was prepared by adding 50 mg SWNT-HiPco to 50 mL of 0.62 wt % sodium dodecylbenzene sulfonate in water and sonicating with a tiphorn (20 kHz and 225 Watts) for 30 minutes. The SWNTs were collected by passing the dispersion through a 0.2 μm Anodisc membrane and then washing with copious water until no surfactant bubbles were observed. The powder was dried for 12 hours at 110° C. and then for 24 hours in vacuum at 160° C. The sample was subsequently characterized by Raman spectroscopy and thermal gravimetric analysis.

Figure 5:
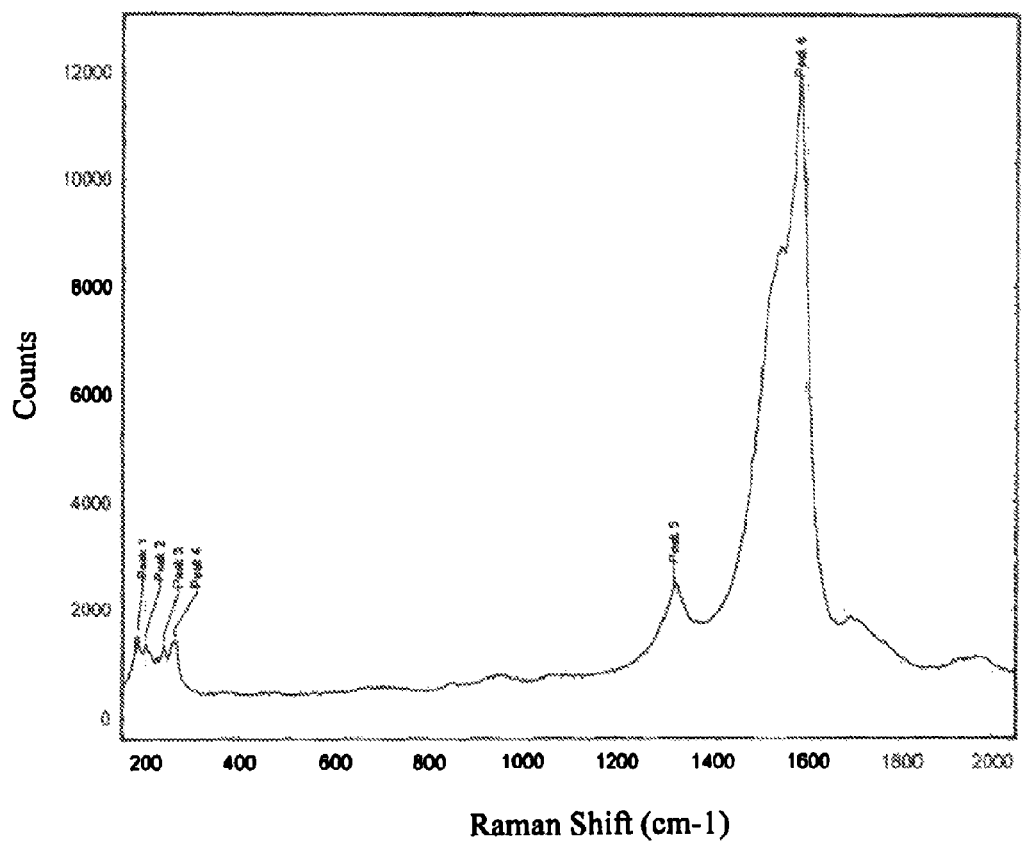
FIG. 5 is a Raman spectrum of as received SWNT-HiPco at 532 nm.
Figure 6:
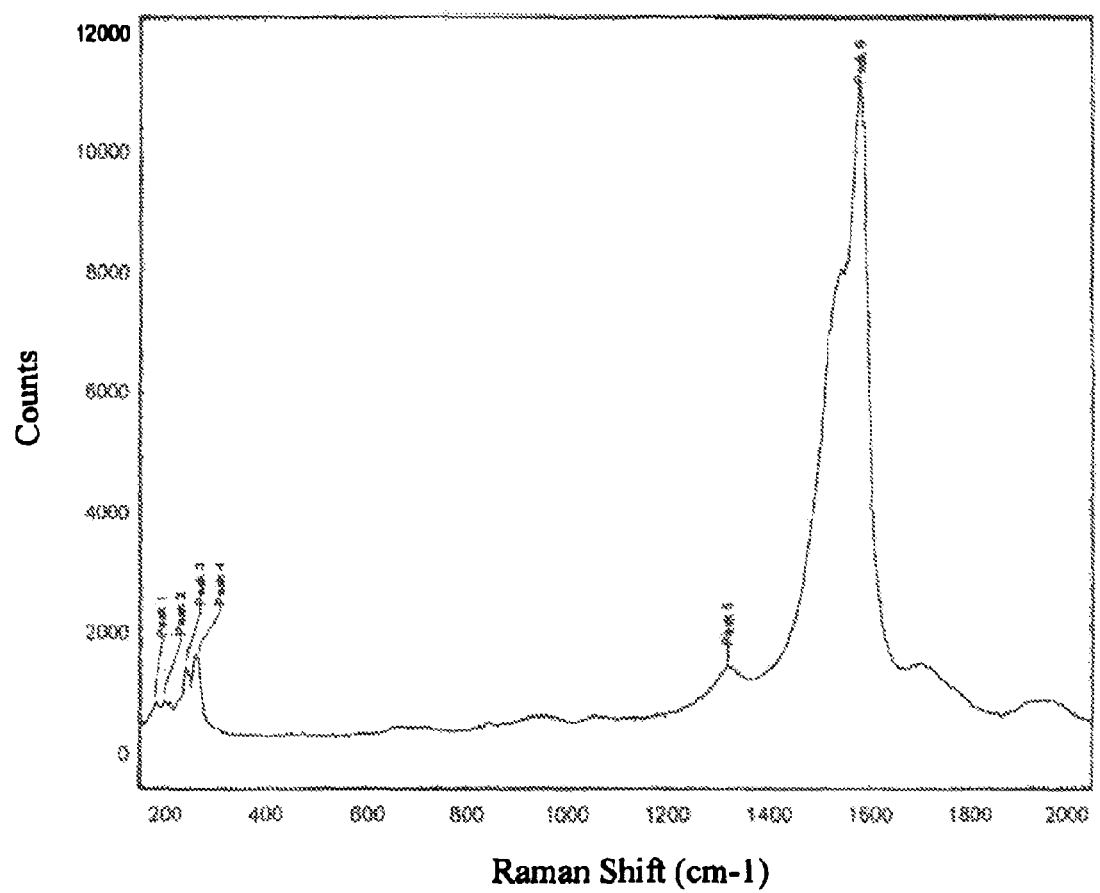
FIG. 6 is a Raman spectrum of SWNT-HiPco at 532 nm after treatment with chlorosulfonic acid.
Figure 7:
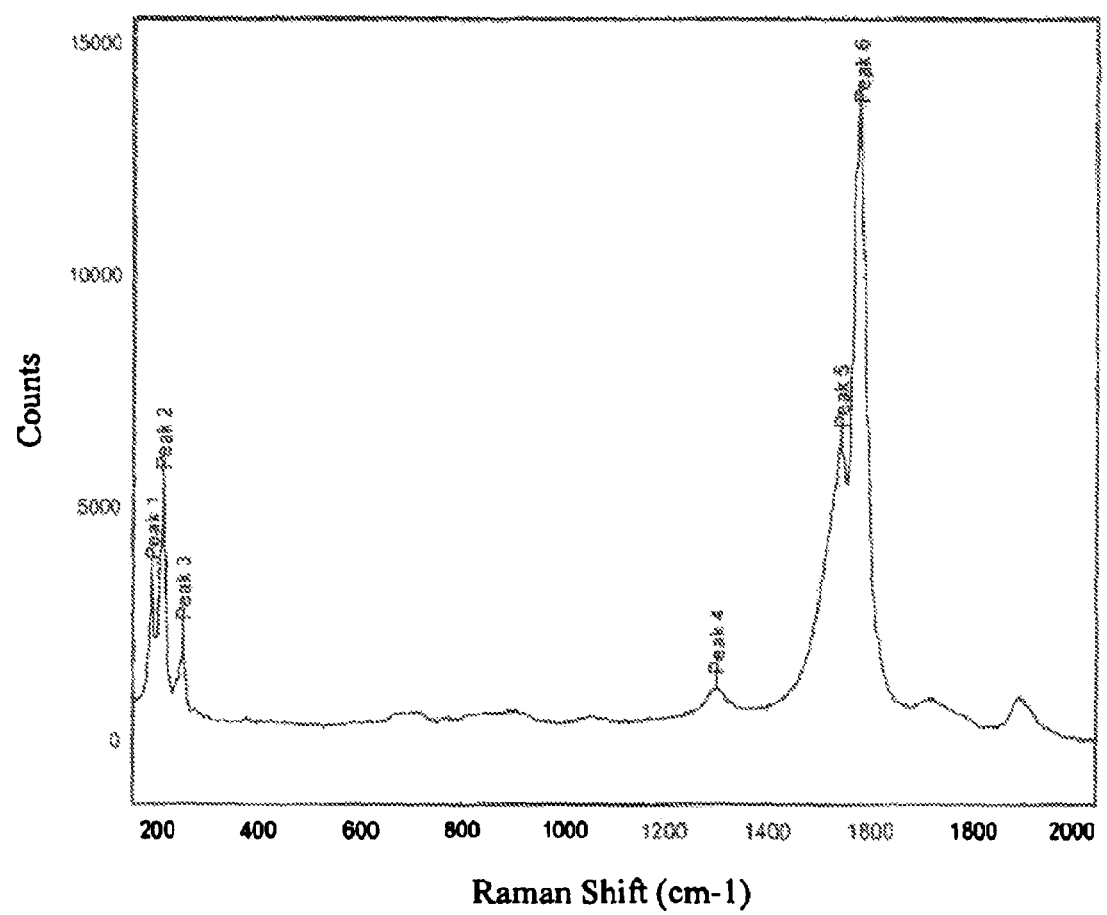
FIG. 7 is a Raman spectrum of as received SWNT-HiPco at 633 nm before treatment with chlorosulfonic acid
Figure 8:
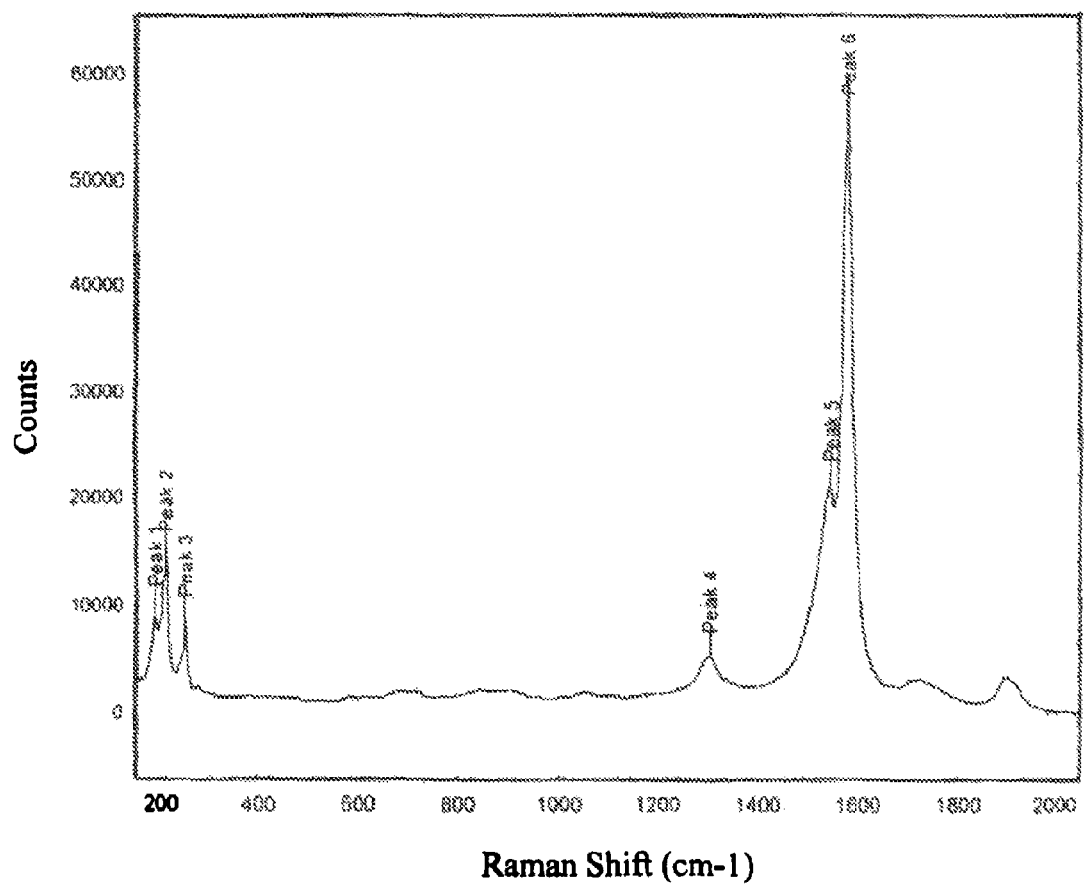
FIG. 8 is a Raman spectrum of SWNT-HiPco at 633 nm after treatment with chlorosulfonic acid.
Figure 9:
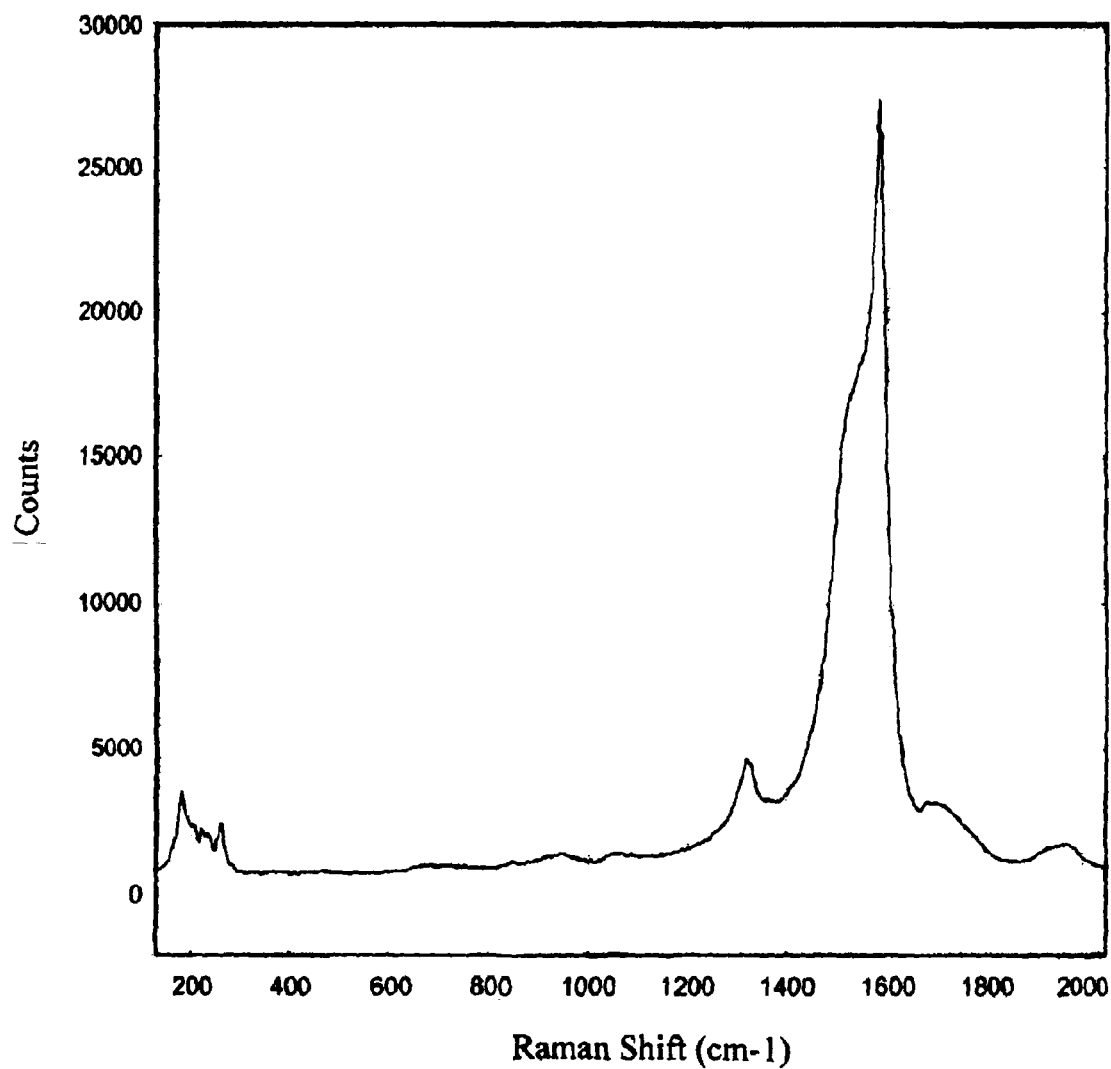
FIG. 9 is a Raman spectrum of SWNT-HiPco at 532 nm after treatment by prior art dispersion method (Comparative Example 3)
Figure 10:
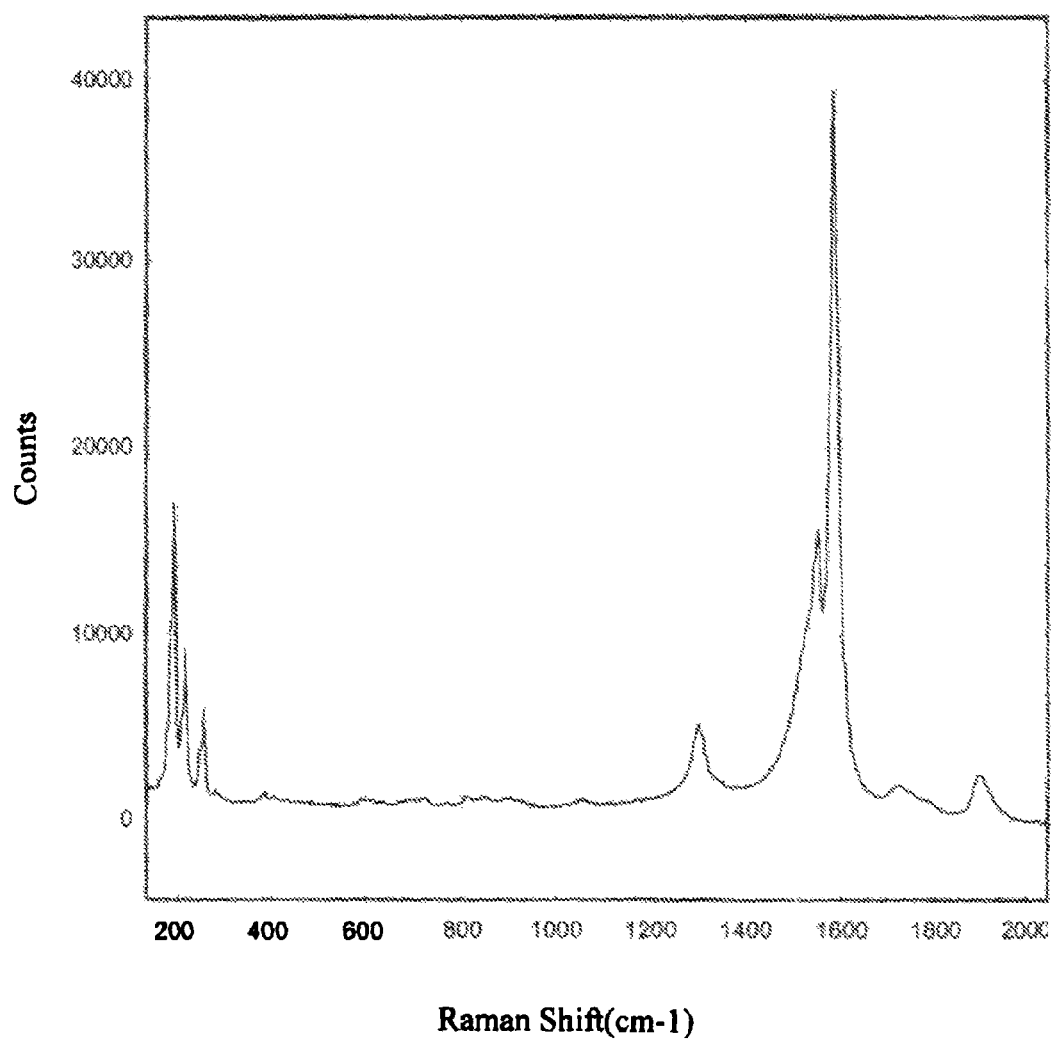
FIG. 10 is a Raman spectrum of SWNT-HiPco at 633 nm after treatment by prior art dispersion method (Comparative Example 3)

The Raman spectra of SWNT-HiPco before and after film preparation as described in Example 5 are shown in FIGS. 5-8. The Raman spectra of SWNT-HiPco after film preparation as described in Comparative Example 3 are shown in FIGS. 9 and 10. FIGS. 5, 6 and 9 are Raman spectra at 532 nm excitation. FIGS. 7, 8 and 10 are Raman spectra at 633 nm excitation. Raman analysis is a useful indicator of the relative purity of the nanotubes. The relative ratio of the integrated intensity of the G mode near 1600 $cm^{-1}$ to the D mode near 1325 $cm^{-1}$ decreases with decreasing purity. Damage to CNTs is accompanied by an increase in the intensity of the D mode. The integrated intensity of the D and G bands for the samples at different excitation wavelength are shown in Table 1.

As shown in the Figures and the Table, the SWNT-HiPco before film preparation exhibit a relatively small D band associated with the purity of the as-received sample. The ratio of the G/D mode intensities is approximately 24, depending on the laser excitation wavelength. After treatment, the ratio of the G/D mode intensity is 23. More scatter is observed as a function of laser excitation wavelength, but this is within experimental error of the method. The results suggest that the treatment and process of this invention do not alter the chemical structure of the CNTs. The difference in the G/D ratio before and after treatment is much less than 30%.

The prior art dispersion treatment (e.g. Comparative Example 3) shows a significant decrease in the G/D. The average is G/D is 20. Comparison of the spectra at 633 nm excitation shows evidence for the advantage of the subject dispersion method over prior art methods. The contribution of the D band is much greater when sonication is used. The spectra at 532 are more difficult to interpret due to the lineshapes caused by the metallic nanotubes.

TABLE 1

Results from Raman analysis of G and D modes of SWNT-HiPco before and after treatment.

| Sample | Excitation Wavelength | Intensity D Band | Intensity G Band | Ratio G/D |
|---|---|---|---|---|
| Before Treatment | 532 | 42271 | 917987 | 21.7 |
|  | 633 | 26994 | 727593 | 26.9 |
| After Treatment by Example 5 | 532 | 27749 | 807388 | 29.1 |
|  | 633 | 154716 | 2653570 | 17.1 |
| After Treatment by Comparative Example 3 | 532 | 75197 | 2083629 | 27.7 |
|  | 633 | 148228 | 1733828 | 11.7 |

Figure 11:
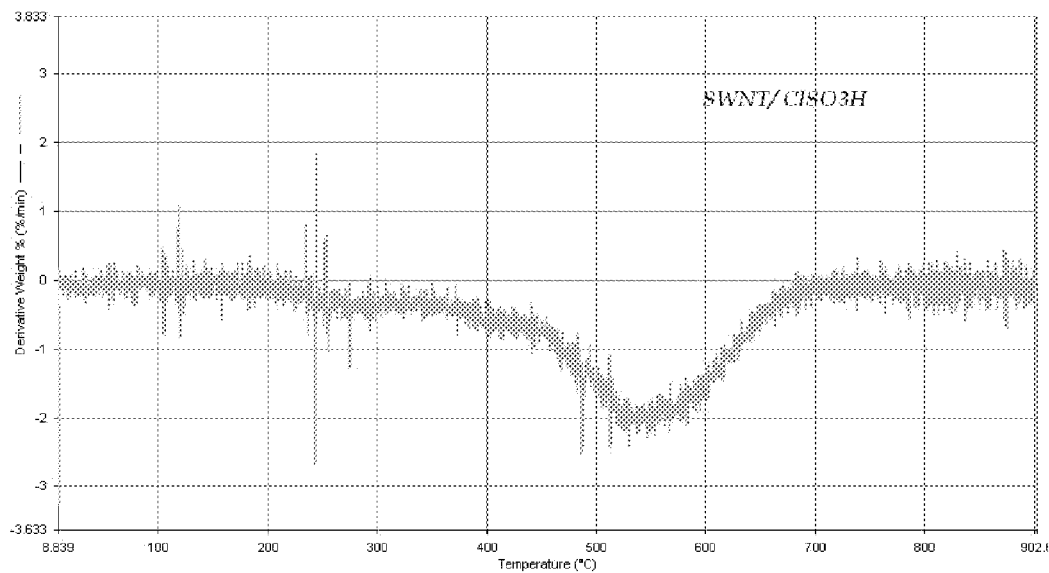
FIG. 11 is a derivative of weight loss curve from TGA of SWNT-HiPco that was dispersed in chlorosulfonic acid.
Figure 12:
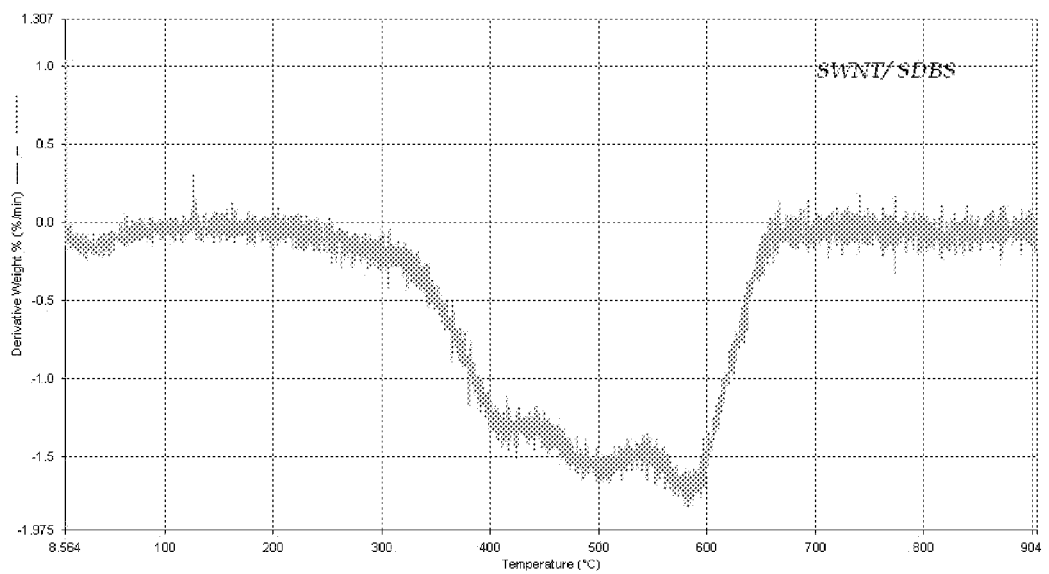
FIG. 12 is a derivative of weight loss curve from TGA of SWNT-HiPco Control that was sonicated in aqueous surfactant solution (Comparative Example 3).

Thermogravimetric analysis is also an indicator of the level of damage that is present in CNT samples. TGA (air at 10° C./min) of powders before and after treatment both show an onset of decomposition near 420° C. The results suggest that little or nor damage was caused by the dispersion treatment. The first derivative of the weight loss curves for the samples after treatment with chlorosulfonic acid is shown in FIG. 11. For comparison purposes, the first derivative curve for a SWNT-HiPco sample prepared by prior art aqueous dispersion methods (e.g. Comparative Example 3) is shown in FIG. 12. This sample shows an onset of decomposition of 358° C., suggesting that significant damage has occurred to the sample.

Figure 13:
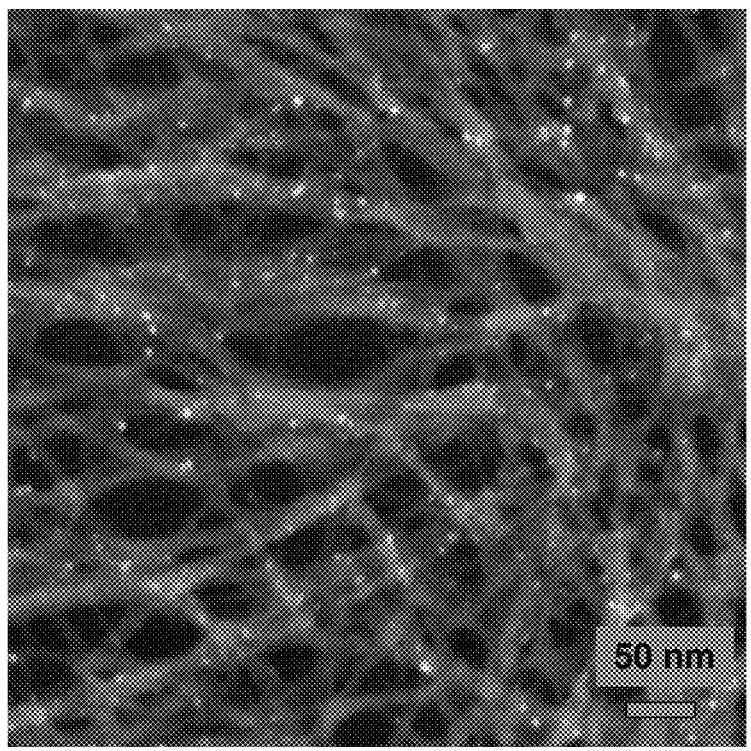
FIG. 13 is a Dark-field STEM image of CNT film prepared by prior art SDBS surfactant method.
Figure 14:
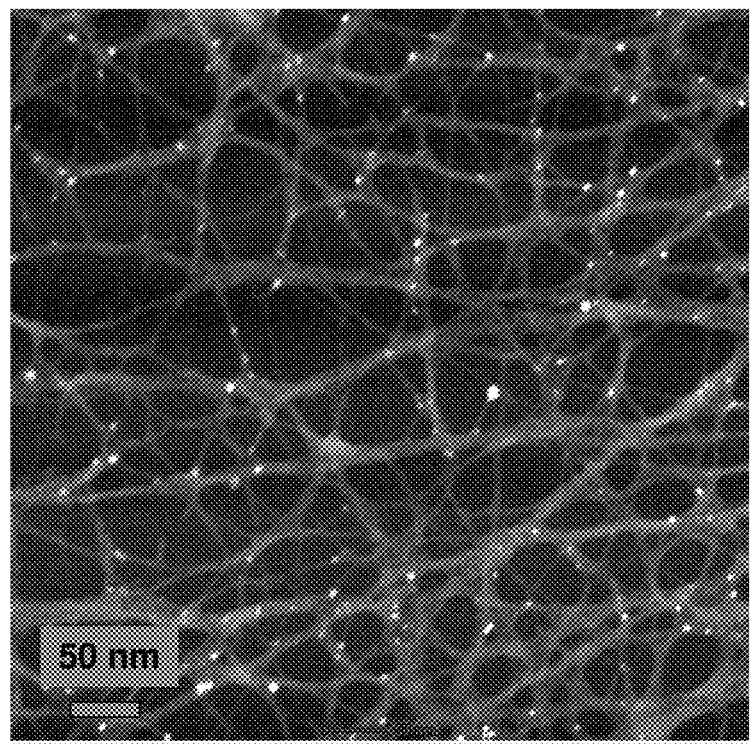
FIG. 14 is a Dark-field STEM image of CNT film prepared by the methods of this invention.
Figure 15:
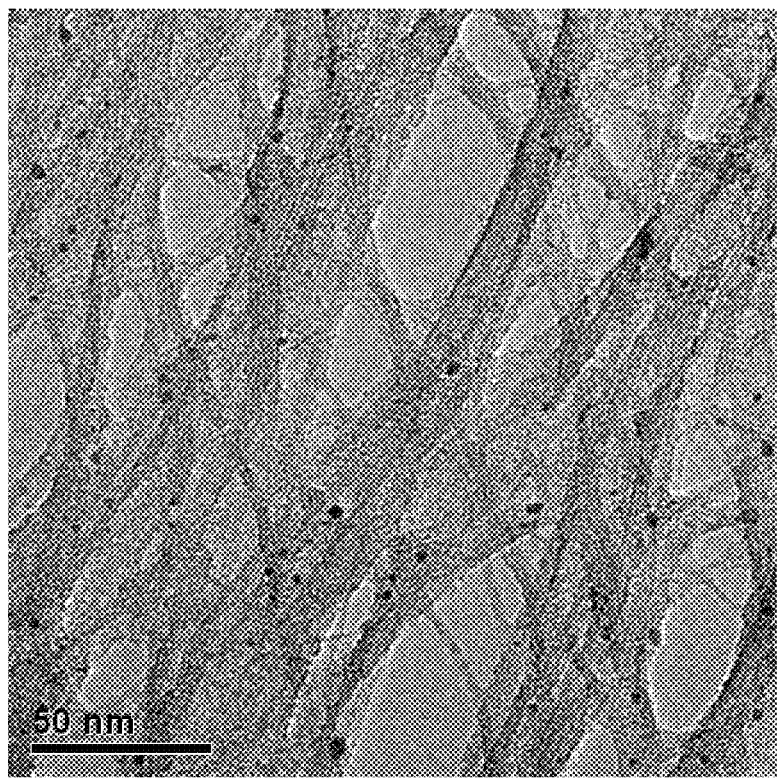
FIG. 15 is a Bright-field TEM image of CNT film prepared by prior art SDBS surfactant method.
Figure 16:
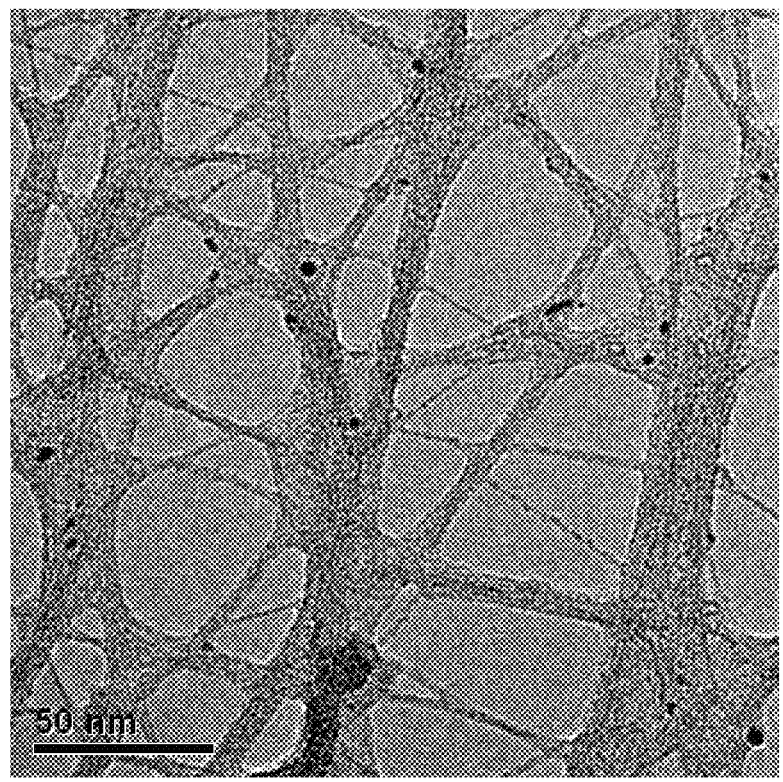
FIG. 16 is a Bright-field TEM image of CNT film prepared by the methods of this invention.

FIGS. 13 and 15 show STEM and TEM images for the CNT film prepared as in Comparative Example 3. FIGS. 14 and 16 show STEM and TEM images for films prepared by the dispersion method of this invention. Comparison of these images reveals that the comparative treated film is much denser than that treated with acid, that much thinner fibers/bundles are observed in the films of this invention, and that in the films of this invention, the larger bundles are inter-connected by many thinner fibers or bundles.

Example 6

Effect of Centrifugation on CNT Film Properties

Although centrifugation is not required to obtain debundling, it may be optionally used to improve the purity of CNT sources. Spherical impurities can be removed from rod-like impurities using mild centrifugation. This is likely due to differences in the diffusion coefficients of spheres versus rods.

Raw SWNTs prepared by Pulsed Laser Vaporization (SWNT-PLV) were obtained from Oakridge National Laboratory. A dispersion was prepared by adding 51.5 mg SWNT-PLV to 10 mL chlorosulfonic acid and stirred for 96 h. The resulting viscous dispersion was centrifuged at 4000 rpm for 1 h. The pellet and supernatant were individually collected, passed through a 0.2 μm Anodisc membrane filter, washed with acetone, and the powders dried under vacuum at 120° C. for 24 h. The powders were analyzed by Raman spectroscopy and thermal gravimetric analysis. Alternatively, the supernatant was diluted and used to prepare a film on Mylar using Method A of Example 1.

Raman analysis of D and G modes of SWNT-PLV samples are shown in Table 2. Analysis of the G-mode area to D-mode area indicates that the supernatant is of higher purity than the initial sample and the pellet, suggesting that centrifugation is effective at removing carbonaceous impurities from raw PLV tubes.

TABLE 2

Summary of Raman data to assess purity

|  | 532 | | |
| --- | --- | --- | --- |
| Sample | G Mode Area | D Mode Area | G/D Ratio |
| PLV-Raw | 310107 | 22531 | 14 |
| PLV-Supernatant | 192113 | 8748 | 22 |
| PLV-Pellet | 200664 | 36082 | 6 |

The SWNT-PLV supernatant was re-dispersed, and transparent membranes were prepared and transferred to polyester substrates. The sheet resistance was evaluated after drying in air for 48 hours, after drying in vacuum oven for 24 h at 100° C., and again after exposing to air for 48 hours. The transmittance was evaluated and compared to blank substrate. The results are shown in Table 3. The sheet resistance and % transmission of this example are similar to those of the results presented in Example 5.

TABLE 3

Results obtained for transparent conductive coatings prepared from raw SWNT-PLV supernatant.

| | Sheet Resistance ($\Omega/\square$) | | | |
| --- | --- | --- | --- | --- |
| Sample | After Air Dry | After Vac Dry | After Air Expose | % T at 550 nm (relative to PE) |
| PLV-Supernatant | 460 | 582 | 570 | 90.8 |

Comparative Example 4

Comparison to Prior Art Acid Dispersion

Mixtures of acid, including superacids, with an oxidizing agent such as nitric acid are often used for purification and light covalent modification of nanotubes. Such dispersions have significantly lower FOM than those of the subject invention. In this example, we prepared a CNT film on Anodisc using the method described in Example 1 with the exception that nitric acid was used in place of the chlorosulfonic acid. Raman spectroscopy showed that the G/D ratio of these films was less than 10, indicating that significant damage had occurred to the sample.

Preferred films of the present invention have a G/D ratio of 15 or greater, preferably 25 or greater. In some embodiments, the inventive films have a G/D ratio similar to that shown in the Figures.

Properties with Different Types of CNTs

Example 8

CNT Films with Varied Types of Nanotubes

The invention is suitable for a wide range of nanotube types and purities. Due to the differences in diameter, the conversion to CNT cations for different nanotube sources requires higher temperatures, longer dispersion times, or stronger acids. The conditions must be optimized for each CNT source. Examples are shown below for several sources; however the examples are not optimized cases, but shown simply to demonstrate the applicability of the method to a wide range of nanotube diameters and types.

SWNT-CVD

Purified, optical electronic grade SWNTs prepared by CVD were obtained from Unidym. Films were prepared according to Example 1 and Method A. Coatings were deposited on PET.

SWNT-Arc:

Purified/Low-functionality grade SWNTs prepared by the Arc Discharge process (SWNT-Arc) were obtained from Carbon Solutions. The SWNTs are reported to consist of 70-90% carbonaceous material and 7-10 wt % metal impurities. A concentrate was prepared by adding 19.5 mg SWNT-Arc to 15 mL of chlorosulfonic acid and stirring for 96 h at room temperature. Prior to use, the concentrate was passed through a plug of glass wool and diluted with chlorosulfonic acid by a factor of three. Alternatively, a coating was deposited on a polyester substrate using Method A of Example 1. A coating was deposited on a polyester substrate using Method B of Example 2.

MWNT-CVD<10 nm:

MWNTs prepared by a CVD process (MWNT-CVD<10 nm) were obtained from Helix Material Solutions. The MWNTs are reported to have an average diameter less than 10 nm, a length from 0.5-40 µm, and a purity of greater than 95 wt %. A dispersion was prepared from ~0.1 mg of MWNT-CVD<10 nm and 10 mL of ClSO3H and stirred at room temperature for 24 h. Coatings were deposited on a polyester substrate using Method A of Example 1.
MWNT-CVD-35 nm:

MWNTs prepared by a CVD process (MWNT-CVD-35 nm) were obtained from Materials and Electrochemical Research Corporation. The MWNTs are reported to have an average diameter of 35 nm, 30 µm length, and purity >90 wt % MWNT. A dispersion was prepared from ~0.1 mg of MWNT-CVD-35 nm and 10 mL of ClSO3H and stirred at room temperature for 96 h. The dispersion was passed through a plug of glass wool prior to use. Coatings were deposited on a polyester substrate using Method A of Example 1.

The sheet resistance and transmission for CNT films prepared from different sources is shown in Table 5.

TABLE 5

Results for different CNT sources

| Source | Film Formation Method | Sheet Resistance (Ω/□) | % T at 550 nm (relative to glass) |
|---|---|---|---|
| SWNT-CVD | A | 1243 | 98.4 |
| SWNT-CVD | A | 60 | 90.9 |
| SWNT-CVD | A | 20 | 71.6 |
| SWNT-Arc | A | 170 | 70.5 |
| SWNT-Arc | B | 170 | 46.7 |
| MWNT-CVD < 10 nm | A | 1650 | 79.0 |
| MWNT-CVD-35 nm | A | 3750 | 69.92 |

The results in Table 5 indicate the outstanding utility of the method to produce films. Films with extremely low sheet resistance can be prepared with very high visible transmission. Correlation of the percent transmission to film thickness indicates that SWNT with percent transmission of 90% have film thickness of approximately 10 to 15 nm. The results indicate that the bulk conductivity of films produced by this invention can exceed 11,000 S/cm and even 15,000 S/cm.
Doped Structure Example 9

Doping of Films Formed with Prior Art Dispersion Methods

It is well known that films formed by prior art dispersion methods require a separate doping step, which serves to enhance the conductivity of the film. HiPco SWNT (CNI, Purified Grade) were dispersed in 0.62 wt % sodium dodecylbenzene sulfonate in D2O by tiphorn sonication. The concentration of nanotubes in the dispersion was 5.5 mg/L. The dispersion (6 g) was passed through a 0.02 µm mixed cellulose ester filter and washed with water. The resulting CNT mat was transferred to PET by: placing the CNT mat in contact with a sheet of PET, applying heat (80° C.) and pressure (<10,000 psi) for 15 minutes, removing the mixed cellulose ester from the PET by carefully peeling or swelling with acetone, and then washing the coated PET with acetone.

Samples were then immersed in a container of liquid thionyl chloride for 2 minutes, maintained under moisture-free conditions. Samples were removed from the liquid, washed with methylene chloride, and then dried with a stream of air. The film had 74% transmission at 550 nm. The sheet resistance before doping was measured to be 532Ω/□ and after was 133Ω/□. Comparison to the data of FIG. 1 shows that even when doped, the prior art films have a much lower FOM than films of this invention Example 10

Doping Films of this Invention

In this example, two films were prepared as in Example 1, with the exception that after the wash step, one sample was immersed in a container of liquid thionyl chloride for 2 minutes, maintained under moisture-free conditions. The sample was removed from the liquid, washed with methylene chloride, and then dried with a stream of air. The sheet resistance of the two films was measured, and showed little difference between the two films. This supports the assumption that using the film formation methods of this invention enhance the conductivity of the films via two mechanisms. One is the film formation methods of this invention create a CNT film that is more debundled and is has a morphology which promotes higher conductivity. The second is theat the film formation methods of this invention can lead to a film which is intrinsically doped during the film formation process, and requires no second doping step.

We claim:

1. A carbon nanotube (CNT) network film, comprising:
    a tangled mass of CNT bundles in the form of a film disposed on a substrate;
    wherein the CNT bundles consist of CNT bundles having mass average diameter of 20 nm or less and a mass average length of 500 nm or more, and
    wherein the CNT bundles have good fiber-to-fiber connectivity such that the film exhibits a sheet resistance of 5000 ohms/square or less.

2. The CNT network film of claim 1 having a transmittance of at least 80% measured at 550 nm.

3. The CNT network of claim 1 wherein the CNT bundles have good fiber-to-fiber connectivity such that the film exhibits a sheet resistance of 1000 ohms/square or less.

4. The CNT network film of claim 1 having a transmittance of at least 90%.

5. The CNT network of claim 4 wherein the CNT bundles have good fiber-to-fiber connectivity such that the film exhibits a sheet resistance of 500 ohms/square or less.

6. The CNT network of claim 2 wherein the CNT bundles have good fiber-to-fiber connectivity such that the film exhibits a sheet resistance in the range of 200 to 3000 ohms/square.

7. The CNT network film of claim 6 having a transmittance of at least 90%.

8. The CNT network of claim 1 wherein the film has an area of at least 1 cm×1 cm.

9. The CNT network of claim 1 having a G/D ratio based on the average of Raman excitation bands at 532 and 633 wave numbers of at least 15.

10. The CNT network of claim 1 wherein the CNT bundles have a mass average diameter in the range of 2 to 10 nm.

11. The CNT network film of claim 10 wherein the film has an area in the range of 1 cm$^2$ to 1000 cm$^2$.

12. The CNT network film of claim 10 wherein the CNT bundles have good fiber-to-fiber connectivity such that the film exhibits a sheet resistance of 200 to 3000 ohms/square or less.

13. The CNT network film of claim 1 wherein the CNT bundles have good fiber-to-fiber connectivity such that the film exhibits a sheet resistance of 200 to 3000 ohms/square or less; and wherein the CNT bundles have a mass average length of 1000 nm or more.

14. The CNT network film of claim 12 having a thickness of 10 to 30 nm.

15. The CNT network film of claim 1 having a thickness of 10 to 45 nm.

16. The CNT network of claim 1 wherein the CNT bundles have a mass average diameter of 10 nm or less.

17. The CNT network of claim 1 wherein the CNT bundles have a mass average diameter of 5 nm or less.

\* \* \* \* \*